US012627960B2

(12) United States Patent
Kumar et al.

(10) Patent No.: US 12,627,960 B2
(45) Date of Patent: May 12, 2026

(54) PHYSICAL LAYER IMPROVEMENTS FOR SHORT RANGE WIRELESS COMMUNICATIONS

(71) Applicant: Google LLC, Mountain View, CA (US)

(72) Inventors: Sunil Kumar, Cupertino, CA (US); Victor Yeh, New Taipei (TW)

(73) Assignee: GOOGLE LLC, Mountain View, CA (US)

( * ) Notice: Subject to any disclaimer, the term of this patent is extended or adjusted under 35 U.S.C. 154(b) by 317 days.

(21) Appl. No.: 18/228,857

(22) Filed: Aug. 1, 2023

(65) Prior Publication Data

US 2024/0129699 A1      Apr. 18, 2024

Related U.S. Application Data

(60) Provisional application No. 63/440,047, filed on Jan. 19, 2023, provisional application No. 63/415,368, filed on Oct. 12, 2022.

(51) Int. Cl.
H04W 4/80              (2018.01)

(52) U.S. Cl.
CPC ........... H04W 4/80 (2018.02); H04R 2420/07 (2013.01)

(58) Field of Classification Search
CPC ............................ H04W 4/80; H04R 2420/07
See application file for complete search history.

(56) References Cited

U.S. PATENT DOCUMENTS

2018/0084456 A1     3/2018  Gostev et al.
2021/0376884 A1    12/2021  Linsky et al.

| | | | |
|---|---|---|---|
| 2022/0030505 A1* | 1/2022 | Lee ........................ | H04W 48/10 |
| 2022/0124471 A1 | 4/2022 | Chen | |
| 2022/0239413 A1 | 7/2022 | Hsieh | |
| 2023/0054769 A1* | 2/2023 | Solum ................. | H04L 65/1101 |
| 2023/0100921 A1* | 3/2023 | Cheong ................. | H04W 76/10 |
| | | | 455/41.3 |
| 2025/0048460 A1* | 2/2025 | Lee ........................ | H04L 69/22 |

FOREIGN PATENT DOCUMENTS

CN          112 492 449   A        3/2021
WO          2021/205235  A1       10/2021

OTHER PUBLICATIONS

Woolley Martin: "The Bluetooth Low Energy Primer", Jun. 6, 2022 (Jun. 6, 2022), pp. 1-87, XP093070516, Retrieved from the Internet: URL:https://www.bluetooth.com/wp-content/uploads/2022/06/Bluetooth_LE_Primer_Paper.pdf [retrieved on Aug. 4, 2023] p. 8 p. 15-p. 18 figures 1, 6.

* cited by examiner

*Primary Examiner* — Kent Krueger
(74) *Attorney, Agent, or Firm* — DORITY & MANNING P.A.

(57)                    ABSTRACT

Various arrangements are presented that provide improvements of short-range wireless communications, such as Bluetooth LE Audio communication. An audio source device may determine that unidirectional audio is to be output. In response to determining that unidirectional audio is to be output, a first physical layer (PHY) configuration can be set for a first communication link in the downlink direction from the audio source device to the audio output device. A second PHY configuration can be set for the communication link in the uplink direction from the audio output device to the audio source device. The first PHY configuration has a greater symbol rate than the second PHY configuration.

20 Claims, 8 Drawing Sheets

600

| Link Budget for BDR/EDR | | FCC Link Budget for LE Audio | | ETSI Link Budget for LE Audio | |
|---|---|---|---|---|---|
| AS to OD | OD to AS | AS to OD | OD to AS | AS to OD | OD to AS |
| X | Y | Z | A+B | W | V+B |

(dB)

Audio Source (AS)
Output Device (OD)

FIG. 6

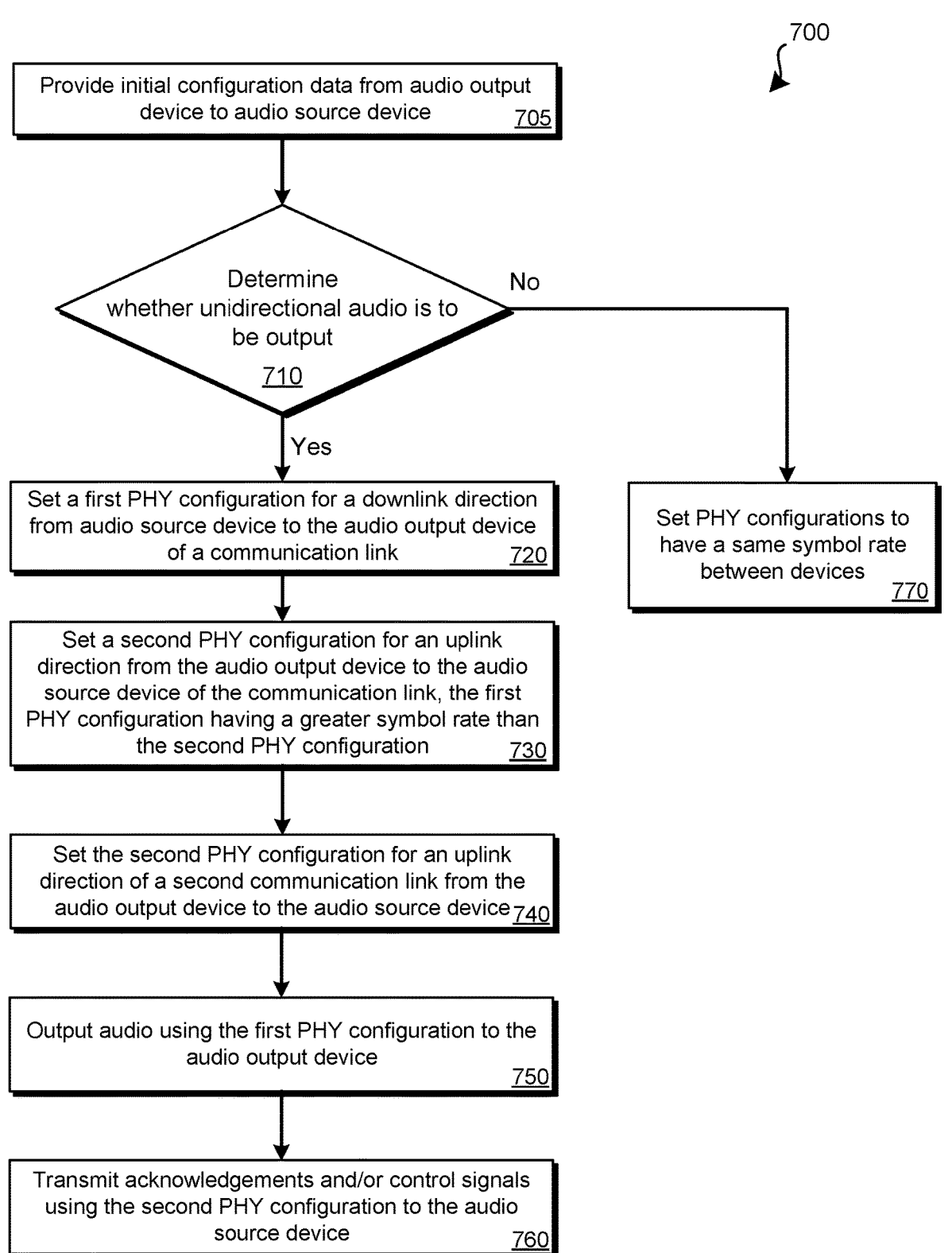

700

Provide initial configuration data from audio output device to audio source device  705

Determine whether unidirectional audio is to be output  710

No

Yes

Set a first PHY configuration for a downlink direction from audio source device to the audio output device of a communication link  720

Set PHY configurations to have a same symbol rate between devices  770

Set a second PHY configuration for an uplink direction from the audio output device to the audio source device of the communication link, the first PHY configuration having a greater symbol rate than the second PHY configuration  730

Set the second PHY configuration for an uplink direction of a second communication link from the audio output device to the audio source device 740

Output audio using the first PHY configuration to the audio output device  750

Transmit acknowledgements and/or control signals using the second PHY configuration to the audio source device  760

FIG. 7

PHYSICAL LAYER IMPROVEMENTS FOR SHORT RANGE WIRELESS COMMUNICATIONS

CROSS-REFERENCES TO RELATED APPLICATIONS

This application claims priority to, and the benefit of U.S. Provisional Patent Application No. 63/415,368, filed Oct. 12, 2022, and U.S. Provisional Patent Application No. 63/440,047, filed Jan. 19, 2023, the entire disclosures of which are incorporated by reference in their entirety.

BACKGROUND

Bluetooth LE Audio may have many advantages for use in streaming audio from an audio source, such as a smartphone, to an audio output device, such as earbuds. Compared to Bluetooth basic data rate/extended data rate (BDR/EDR), which can also be referred to as Bluetooth "classic," the link margin may be smaller with LE Audio. Other audio communications may have a smaller link margin. A smaller link margin means that the wireless communications between the source and output device are more susceptible to interference and attenuation. Accordingly, improving the link margin to decrease the effects of interference and attenuation on communication between the source and output device is desired.

SUMMARY

Various embodiments are described related to improvements in short range a method for improving audio communication, including wireless communications that have smaller link margins, such as Bluetooth LE Audio communications. The method may comprise determining, by an audio source device, that unidirectional audio is to be output. The unidirectional audio may involve audio data being transmitted from the audio source device to an audio output device but no audio data being transmitted from the audio output device to the audio source device. The method may comprise, in response to determining that unidirectional audio is to be output, setting a first physical layer (PHY) configuration for a downlink direction of a first communication link from the audio source device to the audio output device and a second PHY configuration for an uplink direction of the first communication link from the audio output device to the audio source device. The first PHY configuration may have a greater symbol rate than the second PHY configuration.

Embodiments of such a method may include one or more of the following features: wherein the first communication link may be a connected isochronous stream (CIS) link. The first PHY configuration may be 2M and the second PHY configuration may be 1M. The second PHY configuration may be used for the uplink direction of an asynchronous connection-oriented logical transport (ACL) link. The first PHY configuration may be used for the downlink direction from the audio source device to the audio output device for the ACL link. Determining that unidirectional audio is to be output may comprise determining that music is to be output. The audio output device may be an earbud of a pair of true wireless earbuds. The method may comprise initiating, by the audio source device, transmission of audio packets to the audio output device using the CIS link in the downlink direction. The method may comprise receiving, by the audio source device, acknowledgements from the audio output device using the CIS link in the uplink direction. The method may comprise determining a location of the source audio device. Setting the first PHY configuration and the second PHY configuration may be further based on the determined location of the audio source device.

In some embodiments, a system for improving Bluetooth LE Audio communication is described. The system may comprise an audio source device. The audio source device may comprise a wireless communication interface. The audio source device may comprise a processing system comprising one or more processors. The audio source device may be configured to determine that unidirectional audio is to be output. The unidirectional audio may involve audio data being transmitted from the audio source device to an audio output device but no audio data being transmitted from the audio output device to the audio source device. The audio source device may be configured to, in response to determining that unidirectional audio is to be output, set a first physical layer (PHY) configuration for a downlink direction of a first communication link from the audio source device to the audio output device and a second PHY configuration for an uplink direction of the first communication link from the audio output device to the audio source device. The first PHY configuration may have a greater symbol rate than the second PHY configuration.

Embodiments of such a system may include one or more of the following features: a second wireless communication interface and a speaker. The audio output device may be an earbud of a pair of true wireless earbuds. The first communication link may be a connected isochronous stream (CIS) link. The first PHY configuration may be 2M and the second PHY configuration may be 1M. The second PHY configuration may be used for the uplink direction of an asynchronous connection-oriented logical transport (ACL) link. The first PHY configuration may be used for the downlink direction from the audio source device to the audio output device for the ACL link. The audio source device being configured to determine that unidirectional audio is to be output may comprise the processing system of the audio source device being configured to determine that music is to be output. The audio source device may be further configured to initiate transmission of audio packets to the audio output device using the CIS link in the downlink direction. The audio source device may be further configured to receive acknowledgements from the audio output device using the CIS link in the uplink direction. The audio source device may be further configured to determine a location of the source audio device. Setting the first PHY configuration and the second PHY configuration may be further based on the determined location of the audio source device.

In some embodiments, a non-transitory processor-readable medium is described. The medium may comprise processor-readable instructions configured to cause one or more processors of an audio source device to determine that unidirectional audio may be output. The unidirectional audio involves audio data being transmitted from the audio source device to an audio output device but no audio data being transmitted from the audio output device to the audio source device. The medium may comprise processor-readable instructions configured to cause one or more processors of an audio source device to, in response to determining that unidirectional audio is to be output, set a first physical layer (PHY) configuration for a downlink direction of a first communication link from the audio source device to the audio output device and a second PHY configuration for an uplink direction of the first communication link from the audio output device to the audio source device. The first PHY configuration may have a greater symbol rate than the second PHY configuration.

BRIEF DESCRIPTION OF FIGURES

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 6 illustrates an embodiment of a table detailing how link margins can be improved by using a lower symbol rate for uplink communications.

FIG. 7 illustrates an embodiment of a method for improving short-range wireless communication link margins.

DETAILED DESCRIPTION

Figure 1A:
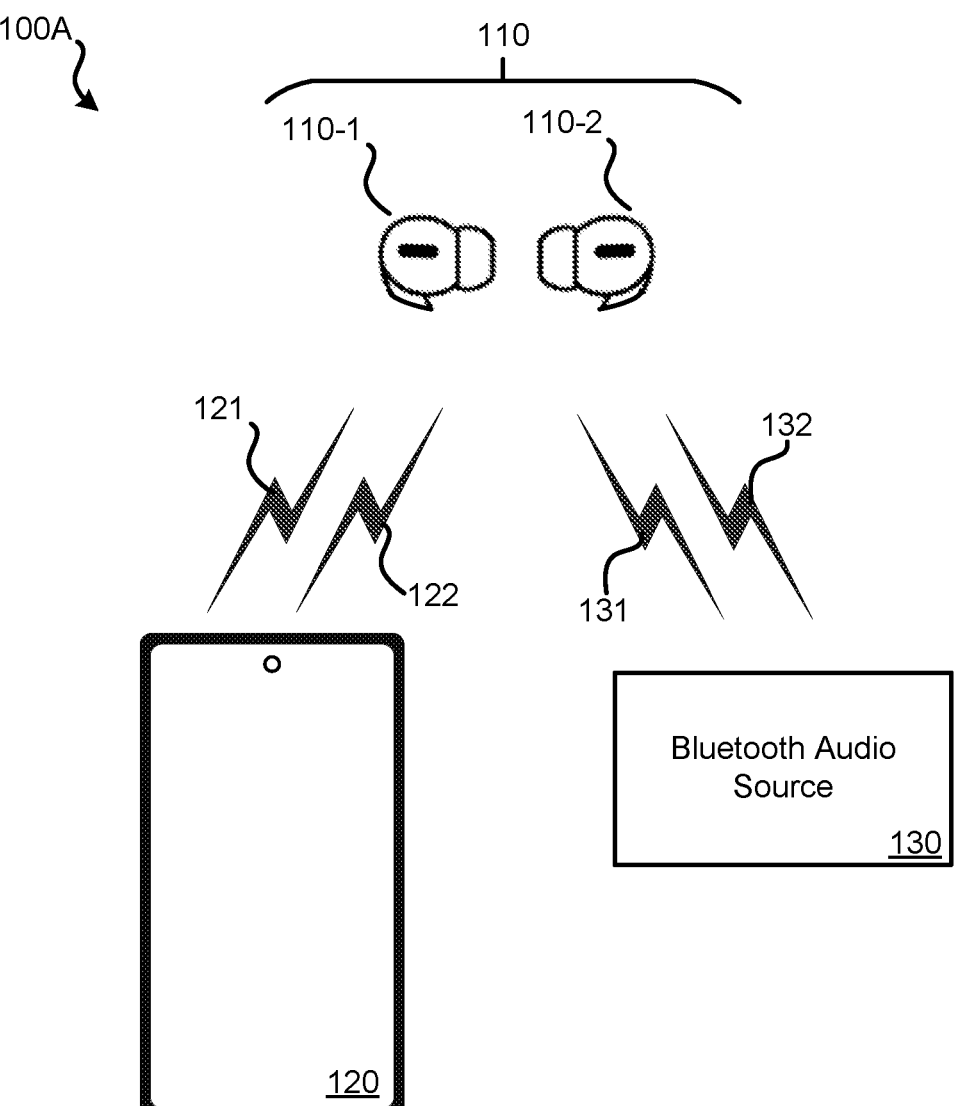
FIG. 1A illustrates an embodiment of an audio system.

Streaming audio to an audio output device, such as an earbud, requires a significant amount of bandwidth. Bluetooth LE allows for multiple physical layer ("PHY") symbol rates. The PHY can be set to use either a 2M symbol rate or a 1M symbol rate, which translates to two mega-symbols or one mega-symbols per second, respectively. While a greater link margin may be present when a lower symbol rate is used compared to a higher symbol rate, the higher symbol rate may be needed to support the transmission of high-bandwidth audio data.

The link margins are usually asymmetric. That is, the link margin varies when comparing data transmissions from a source device to an output device and from the output device to a source device. For Bluetooth LE audio, the link margin may be smallest from the output device to the audio source. As an example, consider a smartphone and a pair of true wireless earbuds. The link margin to transmit packets from the true wireless earbuds to the smartphone may be smaller compared to the link margin from the smartphone to one or both of the true wireless earbuds.

Certain uses require a significant amount of bandwidth in one direction, but little in the other. For example, music playback can require a large amount of bandwidth to stream high-quality audio from a source device to an output device, but little bandwidth in the reverse direction. In contrast, audio conferencing may require relatively high bandwidth in both directions because the audio output device may also function as an audio input device that needs to be relayed to the source device.

When a particular use case only requires high bandwidth data rates from the source device to the output device, such as music playback, a mismatched PHY configuration can be used in order to improve the link margin from the output device to the source device. For example, for music playback, a 2M PHY link configuration can be used for the connected isochronous stream (CIS) from the audio source to the audio output device. However, as part of the CIS link from the output device to the audio source, a 1M PHY link configuration can be used. The 1M PHY link configuration used from the output device to the source device improves the link margin most susceptible to interference and attenuation, while the 2M PHY link configuration used in the opposite direction from the source device to the output device allow for streaming of high-quality audio.

In some embodiments detailed herein, the audio output device is an earbud of a pair of true wireless earbuds. "True wireless earbuds," as used herein, refer to earbuds that both: 1) receive audio packets (e.g., voice packets) wirelessly from one or more audio sources; and 2) are not physically connected with each other, such as via a wire. Therefore, in a pair of true wireless earbuds, each earbud must have its own power supply and wireless communication interface to allow for communication. As described herein, embodiments of earbuds, unless otherwise noted, are directed to true wireless earbuds. Additionally, while the techniques described herein are described with respect to communication between a call gateway device and among earbuds, it should be understood that at least some techniques described herein can have additional applicability. For example, communication techniques described herein could be used in arrangements including one or more computing devices such as one or more smart display and wireless stereo speakers to improve performance.

Figure 1B:
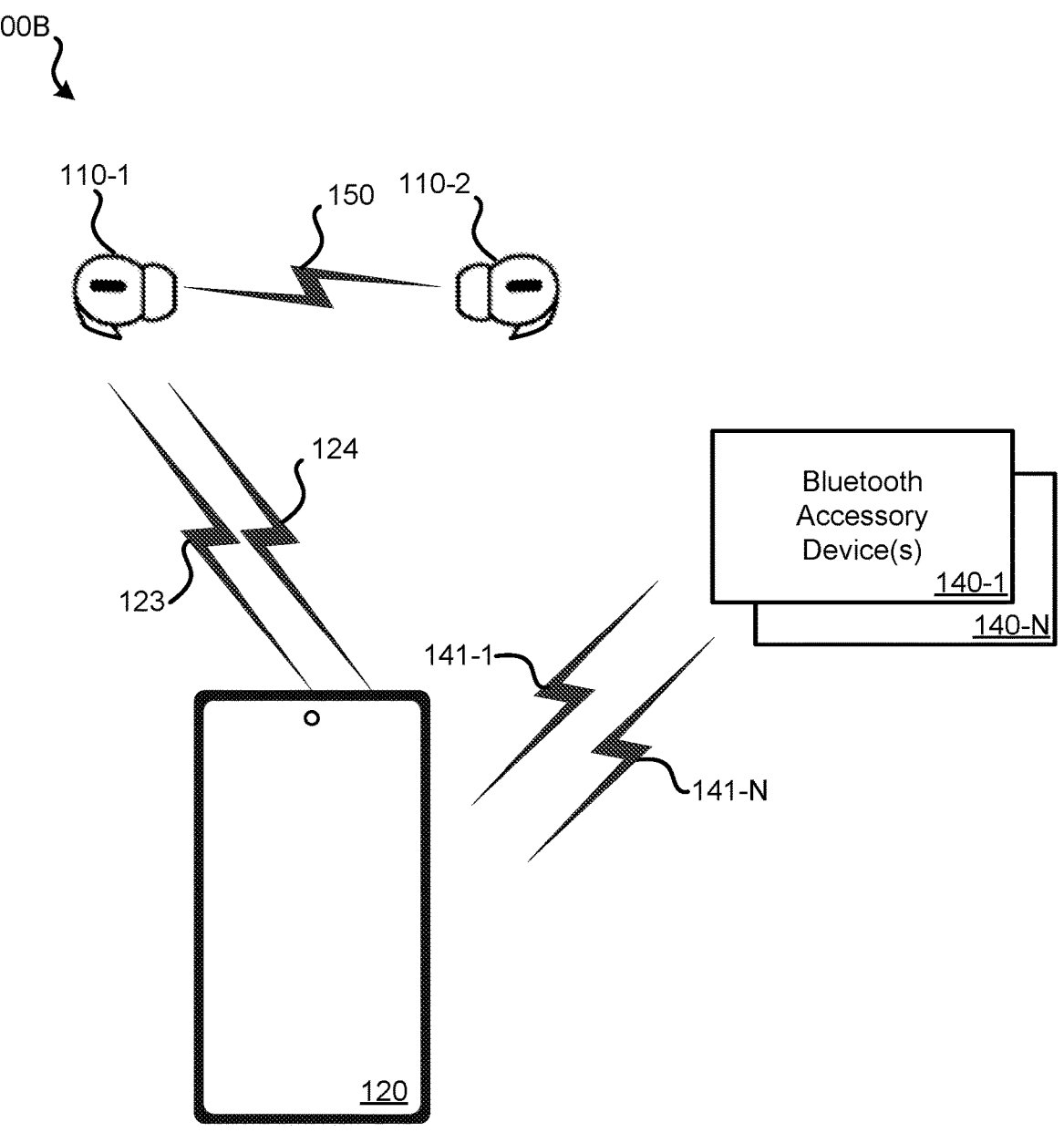
FIG. 1B illustrates another embodiment of an audio system.

FIGS. 1A and 1B illustrate embodiments of an audio system. As shown in FIG. 1A, audio system 100A can include earbuds 110 (which can include earbud 110-1 and earbud 110-2), audio source device 120, and audio source 130, and, as shown in FIG. 1B, audio system 100B can include earbuds 110, audio source device 120, and accessory devices 140 (which can include multiple accessory devices 140-1, . . . 140-N). (Although not shown, audio system 100A can also include accessory devices such as accessory devices 140.) Similarly, audio system 100B can also include additional audio sources such as audio source 130.

Audio source device 120 can represent various forms of computerized devices capable of short-range wireless communication, such as Bluetooth communications. As illustrated, one possible form of audio source device 120 is a smartphone. For example, a smartphone can output stereo audio (e.g., music, gaming audio, audio for an audio or video conference) and mono audio (e.g., audio for a telephone call, mono audio for an audio or video conference). Many other forms of audio source device 120 may be possible, such as: a tablet computer, a gaming device, a laptop computer, a desktop computer, a stereo system, and a television. More generally, any computerized device that outputs Bluetooth audio can serve as audio source device 120. In some embodiments, audio source device 120, when used for voice phone calls, can alternatively be used as and referred to as a call gateway. (In voice call terminology, earbuds 110 can be referred to as a "call terminal.")

In general, Bluetooth-family protocols are used as the short-range wireless technology standards for exchanging data between audio source device 120 (and possibly audio source 130) and earbuds 110 and between audio source device 120 and accessory devices 140. Within the Bluetooth-family, various versions of Bluetooth may be used, depending on the particular embodiment. Bluetooth Basic Rate/Enhanced Data Rate (Bluetooth BR/EDR), which is also referred to as Bluetooth "Classic," can be used in various embodiments as detailed herein. Some embodiments detailed herein rely on Bluetooth Low Energy (LE) or LE Audio as the specific Bluetooth-family protocol for communication. The same hardware may be used to implement any of these Bluetooth-family protocols.

Depending on the version of Bluetooth that is used, one or more Bluetooth profiles may be used to define a connection/communication protocol between a central (or first) device and peripheral (or second) device(s) and between peripheral devices. For example, the connection/communication protocol between the audio source device 120 and earbuds 110 may be defined by the Advanced Audio Distribution Profile (A2DP) and/or the Hands-Free Profile (HFP). Similarly, the connection/communication protocol between the audio source device 120 and the accessory devices 140 may be defined by the Human Interface Device (HID) Profile. The foregoing profiles are not intended to be limiting and the various embodiments described herein can use other Bluetooth profiles such as the Headset Profile (HSP) and the Mesh Profile (MESH).

Further, embodiments detailed herein may use one or more of these Bluetooth-family protocols as a starting point but may have additional features that go beyond the specification of the standard. These additional features require both an audio source and earbuds that are compatible with the additional features to be used in order for the additional features to be available. As an example, one manufacturer may produce earbuds and audio sources (e.g., smartphones, laptop computers, tablet computers) that support additional features that go beyond the minimum features of a Bluetooth-family protocol when used together. However, when one of such devices is used with another manufacturer's devices, such additional features beyond the Bluetooth-family may not be available unless the manufacturers have cooperated on implementing the additional features.

While the embodiments detailed herein are focused on improvements to Bluetooth-family protocols, it should be understood that the embodiments detailed herein can also be applied to other short-range wireless technologies that could be used to enable communication between devices. For example, the embodiments detailed herein are equally applicable to the following technologies: infrared data association (IrDA); radio frequency identification (RFID); wireless local access network (WLAN); near field communication (NFC); ZigBee; Z-wave; wireless fidelity (Wi-Fi) and wireless fidelity direct (Wi-Fi Direct); ultra-wideband (UWB); ANT and ANT+; third generation (3G), fourth generation (4G), fifth generation (5G), and sixth generation (6G), and the like.

As illustrated in FIG. 1A, separate data streams may be used between an audio source and each earbud of earbuds 110. In a Bluetooth LE or LE Audio scenario, a connected isochronous stream (CIS) or broadcast isochronous stream (BIS) may be present on link 121 from audio source device 120 to earbud 110-1. A separate CIS or BIS may be present as part of link 122 to earbud 110-2. If audio is being transmitted from an earbud of earbuds 110 to audio source device 120 (e.g., from a microphone of an earbud for a phone call), another CIS or BIS may be present from an earbud to audio source device 120. Alternatively, the same CIS or BIS can be used for transmitting microphone audio from an earbud to audio source device 120. Separate CISs or BISs may also exist as part of wireless communications 131 and wireless communications 132 between an additional audio source such as audio source 130 and earbuds 110. Separately, between each audio source and each earbud, can be another channel, referred to as an asynchronous connection-oriented link (ACL) that allows for control data to be transmitted between the audio source and the particular earbud in both directions.

While one or more active communication channels are present between audio source device 120 and earbuds 110, one or more separate active communication channels can be present between earbuds 110 and audio source 130. Again here many other audio sources may be possible, such as: a tablet computer, a gaming device, a laptop computer, a desktop computer, a computerized music device, a stereo system, a television, or any computerized device that can output Bluetooth audio can serve as audio source 130.

Various use cases exist where it can be beneficial to a user for earbuds 110 to have communication channels with multiple audio sources. For example, earbuds 110 may receive audio from a computer (e.g., as audio source device 120) for a video conference, but the user may desire to allow his smartphone (e.g., as audio source 130) to output notifications that are played instead of or over the audio for the video conference. As another example, a user may be listening to music via their smartphone (e.g., as audio source device 120), while listening to the music, the user may be in a public place that outputs auditory notifications via Bluetooth, such as flight notifications at an airport. A computerized system of the airport may function as audio source 130 which causes flight notifications to be output instead of or over the audio being streamed to earbuds 110 by audio source device 120.

Notably, audio source 130 may not be present in many embodiments or may only be intermittently present. Referring to the previous example, after leaving the airport (or perhaps disabling notifications), earbuds 110 may only receive audio from audio source device 120. Other similar examples exist. For example, referring to the first example, after conclusion of the video conference, earbuds 110 may only receive audio (e.g., the auditory notifications) from their smartphone. While the example of FIG. 1 illustrates two audio sources, it may be possible for earbuds 110 to receive audio from more than two audio sources. Earbuds 110 may be configured to prioritize and/or mix audio received concurrently from different audio sources.

For mono audio (e.g., a phone call, videoconference), the audio transmitted to one or each earbud of earbuds 110 from an audio source, such as audio source device 120, may be the same. For stereo audio (e.g., music playback, gaming), the audio transmitted to one or each earbud of earbuds 110 differs.

Turning to FIG. 1B, data may be transmitted between an audio source device 120 and a primary earbud such as earbud 110-1 of earbuds 110 and data may be transmitted between the primary earbud 110-1 and a secondary earbud such as earbud 110-2. In a Bluetooth Classic scenario, data may be transmitted using a synchronous connection-oriented (SCO) channel or extended synchronous connection-oriented (eSCO) channel that may be present on link 123 between audio source device 120 and primary earbud 110-1 and data may be transmitted using an ACL that may be present on link 150 between primary earbud 110-1 and secondary earbud 110-2. In some embodiments, the data on link 123 and/or link 150 can include audio or voice data. Control data can be transmitted in both directions using link 124, which can be an ACL link. Control data as used herein generally refers to information pertaining to the link between the audio source device 120 and primary earbud 110-1 and link between primary earbud 110-1 and the secondary earbud 110-2 (e.g., physical layer properties, timing information, encryption keys, power requirements, and the like). If audio is being transmitted from an earbud of earbuds 110 to audio source device 120 (e.g., from a microphone of an earbud for a phone call), the SCO or eSCO link may be used and/or another SCO or eSCO link (not shown) may be used. Separate links may also respectively exist as part of wireless communications 141-1 through wireless communications 141-N between audio source device 120 and accessory devices 140-1 through 140-N. In some embodiments, these links may be a link defined by the HID Profile under the Bluetooth core specification.

While one or more active communication channels are present between audio source device 120 and earbuds 110, one or more separate active communication channels can be present between audio source device 120 and accessory devices 140. Accessory device 140 can represent various forms of computerized devices capable of communicating and exchanging data using Bluetooth connections. One example of an accessory device included in accessory devices 140 is a wireless keyboard and another example of an accessory device included in accessory devices 140 is a wireless mouse. Other examples of accessory devices include human interface devices, printers, scanners, network devices, gaming devices, display assistants, and the like. In general, any computerized device that can communicate using Bluetooth can serve as an accessory device included in accessory devices 140. In some embodiments, an accessory device included in accessory devices 140 can be used as and referred to as a peripheral and/or human interface device.

In some embodiments, communication between earbuds 110 and audio source device 120 can be an acknowledgement, referred to as an ACK for short. An ACK can allow one of or both earbuds 110 to notify the audio source device 120 that a Bluetooth packet was properly received from the audio source device 120. Similarly, an ACK can allow the audio source device 120 to notify one of or both earbuds 110 that a Bluetooth packet was properly received from one of or both earbuds. An ACK and data packets between earbuds can be sent using the same radio used for Bluetooth communications. At a high level, when a packet addressed to a first earbud, such as earbud 110-1, and is properly received by earbud 110-1, earbud 110-1 can transmit an ACK to the audio source device 120. This arrangement can prevent the audio source device 120 from retransmitting the packet to the earbud 110-1 and/or can allow the earbud 110-1 to transmit the packet to the second earbud 110-2 if the second earbud 110-2 cannot intercept and/or otherwise acquire the packet transmitted from the audio source device 120. While an ACK is one form of communication that can occur between audio source device 120 and earbuds 110, other communications detailed herein between earbuds may not involve an ACK being transmitted.

Figure 2:
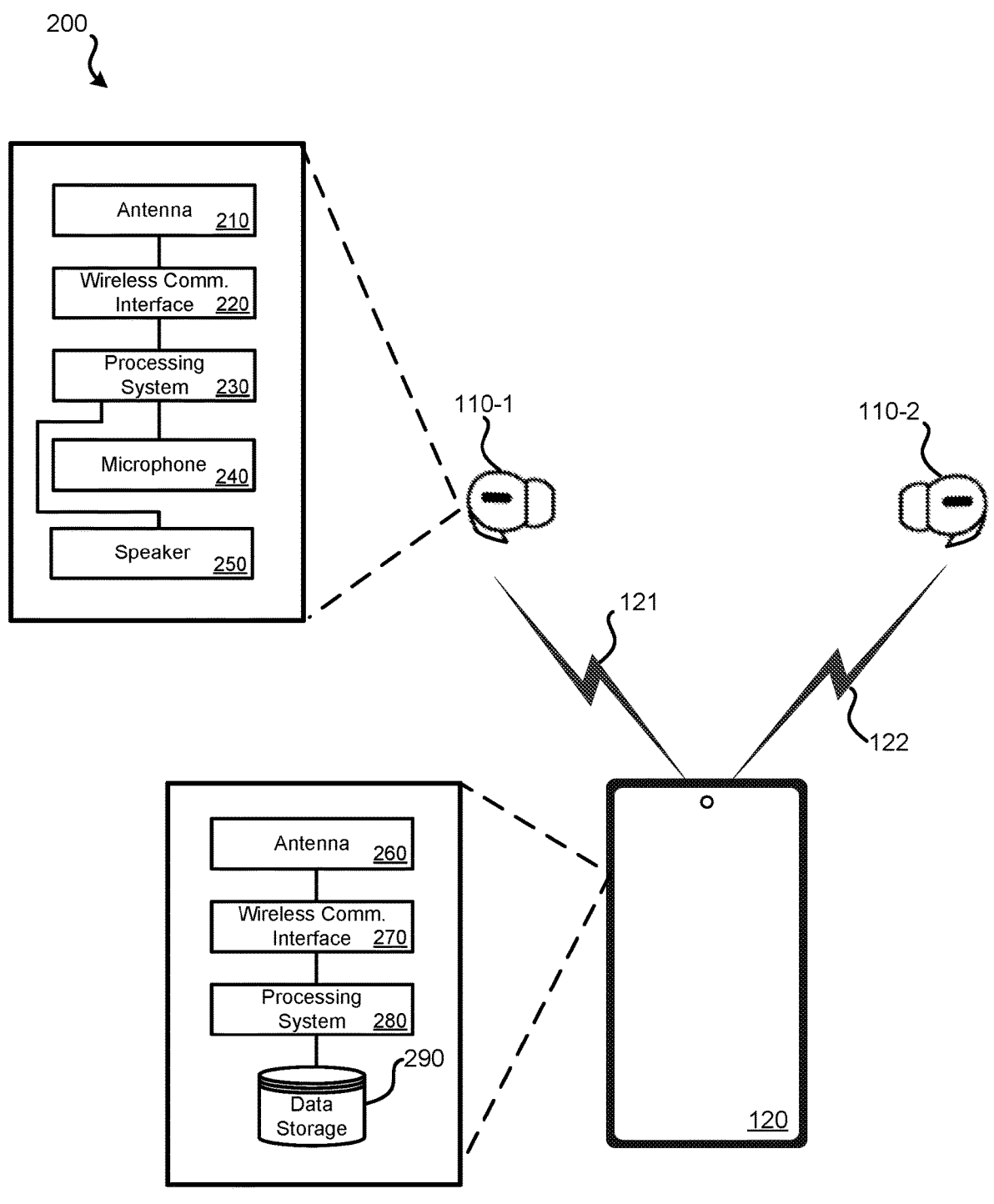
FIG. 2 illustrates an embodiment of a block diagram of an audio system that includes a pair of true wireless earbuds communicating with an audio source.

FIG. 2 illustrates an embodiment of a block diagram of an audio system 200 that includes a pair of true wireless earbuds communicating with an audio source. Audio system 200 can represent an embodiment of audio system 100A in which only a single audio source is present or audio system 100B. Audio system 200 can include earbuds 110 and audio source device 120.

Referring to earbuds 110, components of earbud 110-1 can include: antenna 210; wireless communication interface 220; processing system 230; microphone 240; and speaker 250. Earbud 110-2 may have the same components. Antenna 210 can be used for receiving and transmitting Bluetooth-family communications, including BR/EDR, and LE (including LE Audio which uses LE). Wireless communication interface 220 can be implemented as a system on a chip (SOC). Wireless communication interface 220 can include a Bluetooth radio and componentry necessary to convert raw incoming data (e.g., audio data, other data) to Bluetooth packets for transmission via antenna 210. Wireless communication interface 220 may also include componentry to enable one or more alternative or additional forms of wireless communication, both with an audio source and between earbuds. Processing system 230 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored locally using one or more non-transitory processor-readable mediums, such as random-access memory (RAM), and/or flash memory. In some embodiments, processing system 230 and wireless communication interface 220 may be part of a same circuit or SOC.

In some earbuds, microphone 240 may be present. In some embodiments, each of earbuds 110 has a microphone. In other embodiments, only one of earbuds 110 has a microphone. In still other embodiments, no microphone may be present in either of earbuds 110. Audio captured using the one or more microphones of earbuds 110 can be transmitted to audio source device 120. This audio, which can be referred to as "upstream" audio, may include voice, such as for use in a telephone call, video conference, gaming, etc. Various componentry (not illustrated) may be present between wireless communication interface 220, processing system 230, and microphone 240, such as an analog to digital converter (ADC) and an amplifier.

Speaker 250 converts received analog signals to audio. Various componentry (not illustrated) may be present between wireless communication interface 220, processing system 230, and speaker 250, such as a digital to analog converter (DAC) and an amplifier.

Various components of earbud 110-1 are not illustrated. In addition to the ADC, DAC, and amplifiers previously mentioned, earbud 110-1 also includes a power storage component, such as one or more batteries, and associated componentry to allow for recharging of the power storage component. Also present is a housing and componentry to hold earbud 110-1 within a user's ear. One or more non-transitory processor readable mediums can be understood as present and accessible by wireless communication interface 220, processing system 230, or both. For instance, such mediums may be used for temporary storage of data (e.g., buffers) and storing data necessary for Bluetooth communication (e.g., encryption keys).

Audio source device 120 can include: antenna 260; wireless communication interface 270; processing system 280; and data storage 290. Antenna 260 can be used for receiving and transmitting Bluetooth-family communications, including BR/EDR, and LE. Wireless communication interface 270 can be implemented as a SOC. Wireless communication interface 270 can include a Bluetooth radio and componentry necessary to convert raw incoming data (e.g., audio data, other data) to Bluetooth packets for transmission via antenna 260. Wireless communication interface 270 can additionally or alternatively be used for one or more other forms of wireless communications. Processing system 280 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored locally using one or more non-transitory processor-readable mediums via data storage 290, which can include RAM, flash memory, a HDD and/or a SSD. In some embodiments, processing system 280 and wireless communication interface 270 may be part of a same circuit or SOC.

Audio source device 120 can include various other components. For example, if audio source device 120 is a smartphone, various components such as: one or more cameras, a display screen or touch screen, volume control buttons, other wireless communication interfaces can be present.

Figure 3:
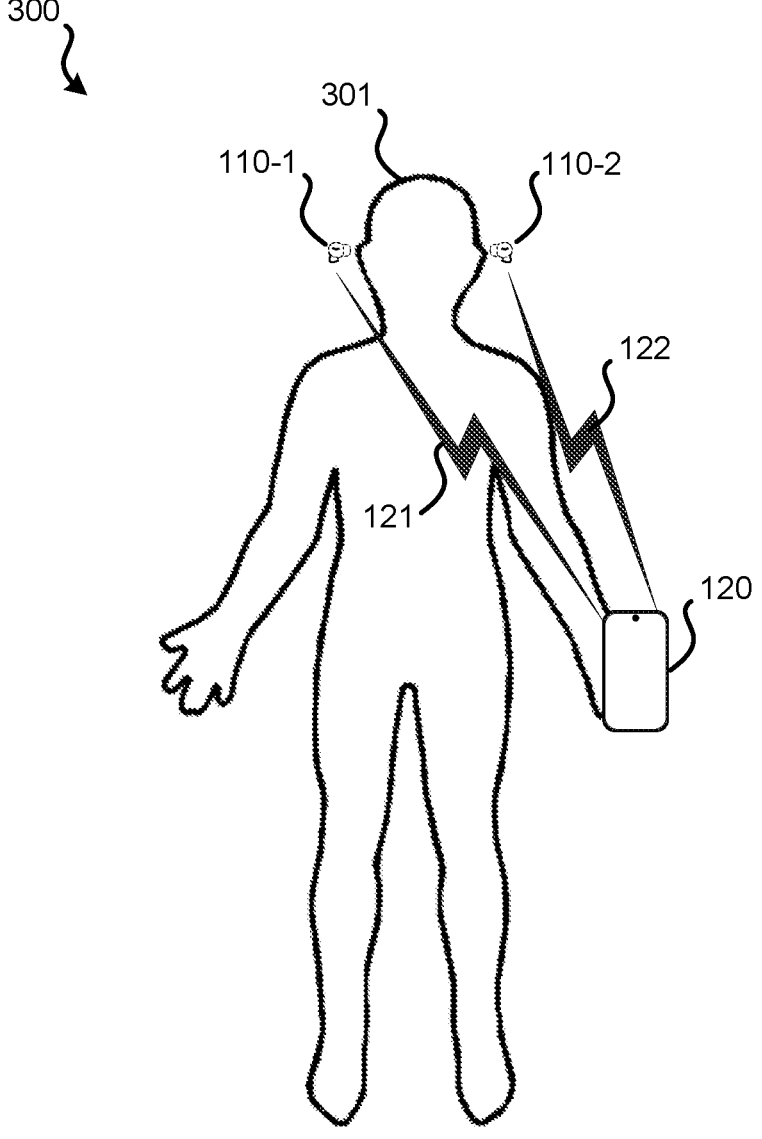
FIG. 3 illustrates an embodiment of cross-body attenuation resulting in communication between an audio source and a first earbud experiencing more attenuation than communication between the audio source and the second earbud.

FIG. 3 illustrates an embodiment 300 of cross-body attenuation resulting in communication between an audio source and a first earbud experiencing more attenuation (or path loss) than communication between the audio source and the second earbud. In embodiment 300, user 301 is holding audio source device 120 in their left hand (that is, as illustrated, user 301 is facing out of the page). Bluetooth communications occur between audio source device 120 and earbud 110-2 as indicated by link 122; Bluetooth communications between audio source device 120 and earbud 110-1 as indicated by link 121.

Due to audio source device 120 being in the user's left hand, link 121 with earbud 110-1, which is in the user's right ear, results in wireless signals travelling through more of the user's body than link 122. Therefore, more attenuation occurs in link 121 than link 122. Accordingly, it is more likely that Bluetooth data packets exchanged between earbud 110-1 and audio source device 120 may be not properly received than Bluetooth data packets exchanged between earbud 110-2 and audio source device 120.

Which earbud experiences more attenuation and/or interference in its communications with an audio source can vary based on the location of audio source device 120. Common places where user 301 may keep audio source device 120 are: in a left hand; in a right hand; in a front left or right pocket, in a rear left or right pocket; on an arm band; in a left or right chest pocket; and on a surface or dock. Each of these locations can result in significantly different communication paths between each earbud and the antenna of the audio source and, thus, one earbud's communications can experience significantly higher interference or attenuation than the other earbud's communications.

Figure 4:
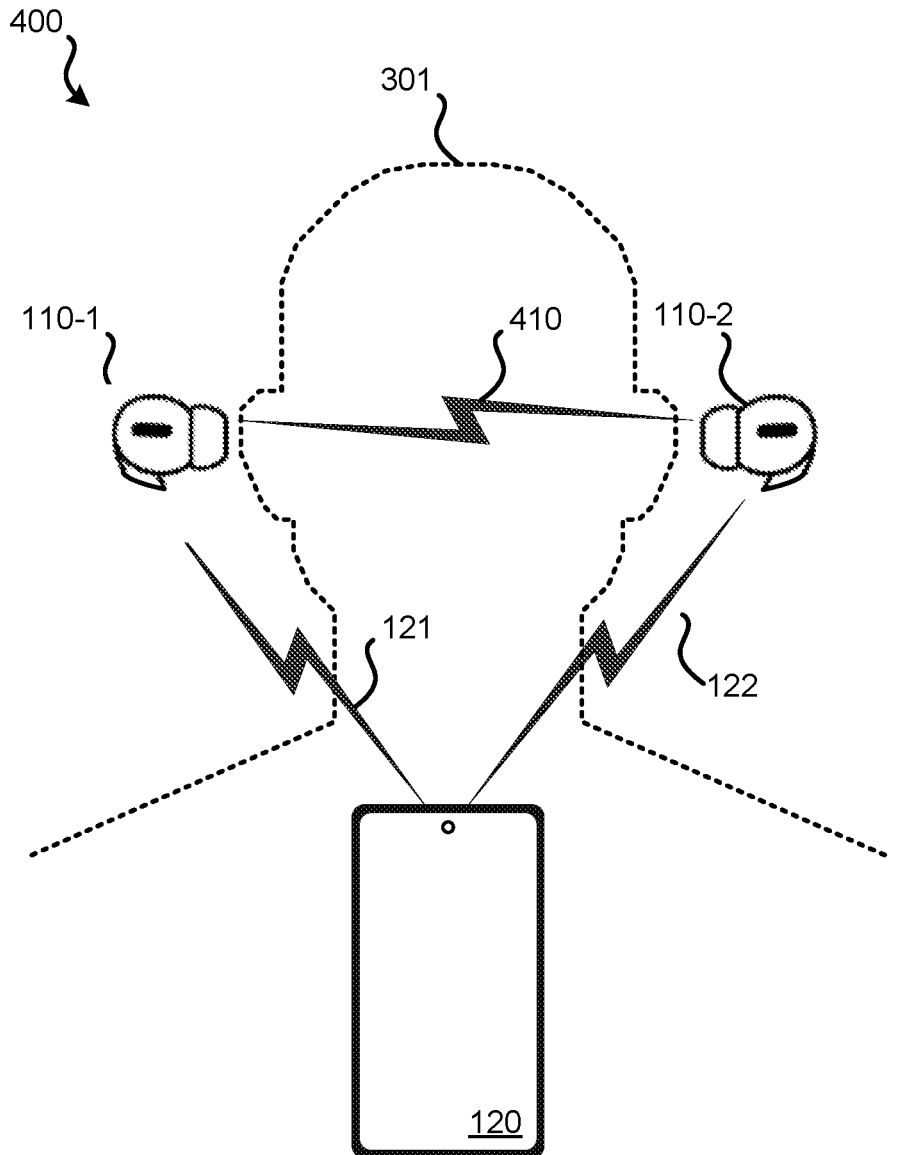
FIG. 4 illustrates an embodiment of an audio system in which true wireless earbuds communicate with each other in addition to communicating with an audio source.

FIG. 4 illustrates an embodiment of an audio system 400 in which true wireless earbuds communicate with each other in addition to communicating with an audio source. Earbud 110-1 can perform wireless communications using cross-link 410 with earbud 110-2 and, similarly, earbud 110-2 can perform wireless communications using cross-link 410 with earbud 110-1 in some embodiments. This communication can occur via a proprietary link specific to earbuds 110 and therefore can be outside of any Bluetooth family protocol specification. The path between earbuds 110, when in use by user 301, is predictable because the distance and the object through which the signals pass (the head of user 301) remains constant. As detailed herein, the ability of earbuds 110 to communicate with each other can have significant advantages.

Cross-link 410 can use LE 1M, LE 2M, LE HDT (pending standardization), LE proprietary high data rate modes, classic BR/EDR, or some proprietary communication scheme. Therefore, while Bluetooth-compliant wireless communications occur between earbuds 110 and audio source device 120, communications directly between earbuds do not necessarily need to be compliant with Bluetooth or any other particular communication protocol.

In some embodiments, communication between earbuds 110 can be a cross-acknowledgement, referred to as a CrossACK for short. As detailed herein, "cross-" communications refer to wireless communications transmitted directly from a first earbud and received by a second earbud. A CrossACK can allow one of earbuds 110 to notify the other earbud of earbuds 110 that a Bluetooth packet was properly received from a source device. A CrossACK and data packets between earbuds can be sent using the same radio used for Bluetooth communications. At a high level, when a packet addressed to only a first earbud is not properly received by the first earbud, but is properly received by the second earbud, the second earbud can transmit a CrossACK to the first earbud. The first earbud may then request the packet be relayed to the first earbud from the second earbud. This arrangement prevents the first earbud from having to request retransmission from the source device and/or can allow the first earbud to obtain the data from the second earbud if transmissions from the audio source continue to fail. While a CrossACK is one form of communication that can occur between earbuds 110, other communications detailed herein between earbuds may not involve a CrossACK being transmitted.

Notably, while the description contained herein focuses on Bluetooth and Bluetooth-family protocols including LE Audio, the same principles detailed herein can be applied to other short-range wireless communication protocols.

Figure 5:
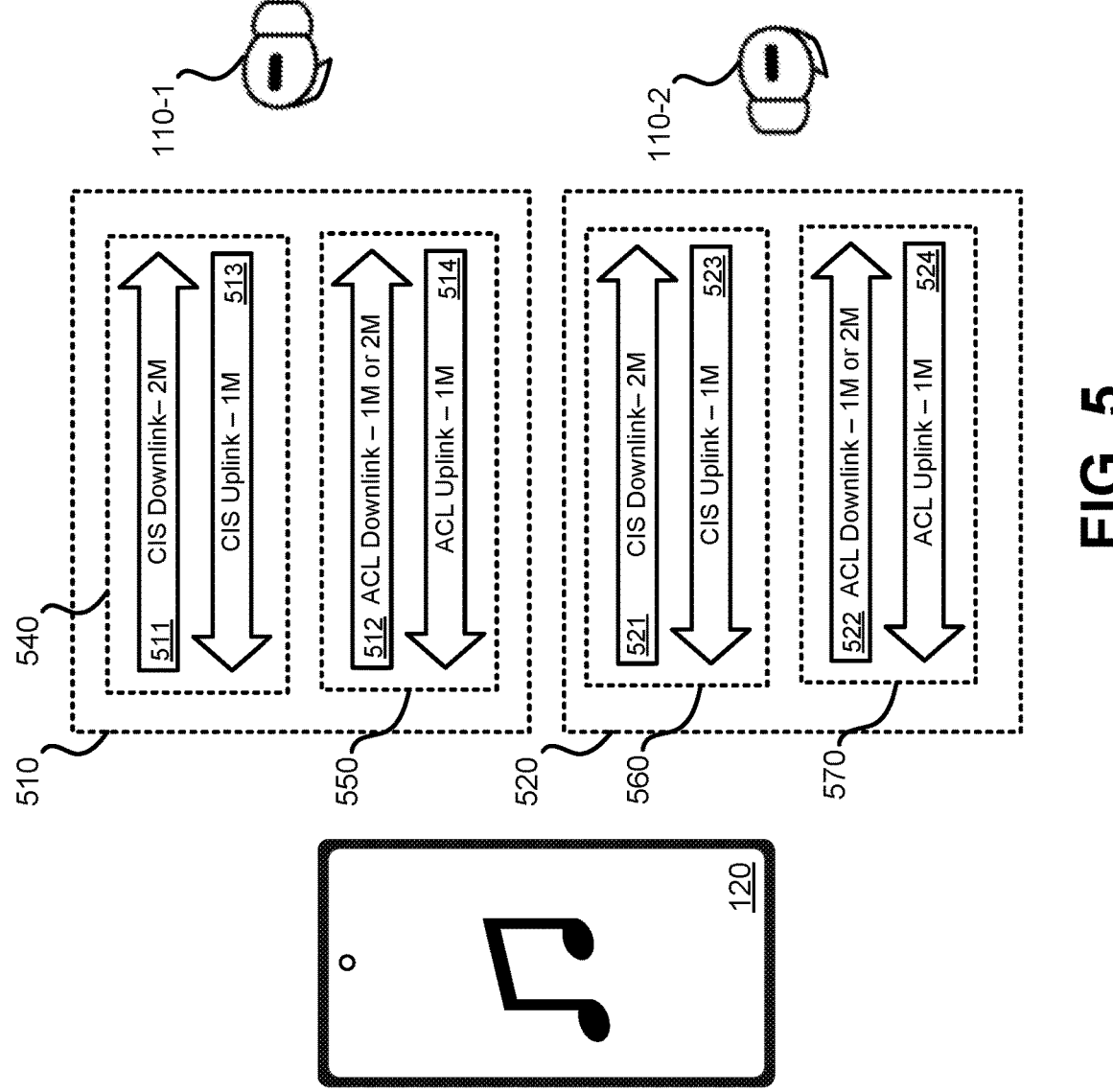
FIG. 5 illustrates an embodiment of an audio source device communicating with audio output devices using different symbol rates for downlink and uplink communications.

FIG. 5 illustrates an embodiment of a system 500 that includes an audio source device communicating with audio output devices using different symbol rates for downlink and uplink communications. System 500 can represent an embodiment of system 100A or system 100B. System 500 includes audio source device 120 and earbuds 110. In other embodiments, a single earbud may be present. Further, earbuds 110, which can be true wireless earbuds, are shown as an example of a type of audio output device. Other types of headphones or speaker(s) may be used in place of an earbud or pair of earbuds.

In system 500, audio source device 120, prior to beginning to stream audio to one or both earbuds 110, determines that the audio to be transmitted is unidirectional. Unidirectional audio refers to audio being transmitted from audio source device 120 to earbuds 110 without audio being transmitted from earbuds 110 to audio source device 120. As an example, streaming unidirectional audio to earbuds 110 can include streaming music such as from a streaming music application (e.g., Google Play Music, Apple Music, Spotify) or from locally stored files of audio source device 120. Streaming unidirectional audio can also include streaming non-music content, such as a podcast or audio book. Another example of unidirectional audio could be the streaming of audio packets from an audio capture device (e.g., Bluetooth microphone) to another device (e.g., computer system or smartphone). In contrast, streaming unidirectional audio does not include audio conferencing, video conferencing, or telephone calls in which audio is captured by earbuds 110 and transmitted to audio source device 120.

Communication links 510 represent the multiple communication links that exist between audio source device 120 and earbud 110-1; and communication links 520 represent the multiple communication links that exist between audio source device 120 and earbud 110-2. Referring to communication links 510, in a Bluetooth LE Audio arrangement, a CIS link 540 is present. CIS link 540 is a single link that allows for bidirectional communication, represented as CIS downlink direction 511 and CIS uplink direction 513. Similarly, ACL link 550 is present, which allows for bidirectional communication, represented as ACL downlink direction 512 and ACL uplink direction 514. CIS link 540 is used to transmit sound or music packets and corresponding acknowledgement packets. ACL link 550 is used for transmitting control data, such as a play command, and corresponding responses. CIS downlink direction 511 and ACL downlink direction 512 can be referred to as "downlink" communication channels. In the opposite direction, CIS uplink direction 513 and ACL uplink direction 514 are present to transmit audio data and control data, respectively, from earbud 110-1 to audio source device 120. CIS uplink direction 513 and ACL uplink direction 514 can be referred to as "uplink" communication channels.

Rather than each communication channel using the same symbol rate, when unidirectional audio is to be transmitted by audio source device 120 to earbud 110-1, the PHY symbol rate can be set to be lower in a particular direction. For example, for reasons such as antenna design and/or power constraints, the transmitted signal strength in the uplink direction can tend to be lower than the transmitted signal strength in the downlink direction, thus resulting in a lower link margin for uplink communications. Therefore, if a same symbol rate is used for both uplink and downlink transmissions, due to interference and/or attenuation, uplink packets are more likely to be lost than downlink packets. Since uplink communications are needed even for unidirectional audio, such as to transmit acknowledgements, negative acknowledgements, and control signals, improvement of the link margin for uplink communications as part of CIS link 540 and ACL link 550 can help increase the overall robustness of communication between audio source device 120 and earbud 110-1.

In order to stream high-quality unidirectional audio, such as high-quality music, a high PHY symbol rate may be needed. As such, CIS downlink direction 511, on which audio packets are transmitted to earbud 110-1, uses 2M PHY. Less bandwidth-intensive data may be transmitted on ACL downlink direction 512, such as control data, and, thus 2M or 1M PHY may be used. Rather than using 2M PHY for uplink communications, 1M PHY is used for CIS uplink direction 513 and ACL uplink direction 514. Since no upstream audio is being transmitted, relatively little information is transmitted on CIS uplink direction 513 (compared to CIS downlink direction 511) for which a 1M PHY is sufficient. For example, CIS uplink direction 513 may primarily be used to acknowledge receipt of audio packets received on CIS downlink direction 511. ACL uplink direction 514 may transmit a small amount of control data for which 1M PHY is sufficient.

While the above description notes that the PHY symbol rate for uplink directions 513 and 514 is 1M and the PHY symbol rate for CIS downlink direction 511 is 2M, in other embodiments different symbol rates may be possible. Rather, a key aspect is that the symbol rate for the uplink direction with the lower link margin, which also has the lower bandwidth requirements, uses a lower symbol rate. Therefore, in order to increase the link margin, uplink directions 513 and 514 use a lower symbol rate than CIS downlink direction 511. By using a lower symbol rate, the link margin in the uplink direction can be raised substantially, such as by 3 dB.

If two audio output devices are present, such as in the case of true wireless earbuds 110 of system 500, communication links 520 may be configured in a similar manner to communication links 510. CIS link 560 is a single link that allows for bidirectional communication, represented as CIS downlink direction 521 and CIS uplink direction 523. Similarly, ACL link 570 is present, which allows for bidirectional communication, represented as ACL downlink direction 522 and ACL uplink direction 524. As such, to stream unidirectional high-quality audio, CIS downlink direction 521, on which audio packets are transmitted to earbud 110-1, uses 2M PHY. Less bandwidth-intensive data may be transmitted on ACL downlink direction 522, such as control data, and, thus 2M or 1M PHY may be used. Rather than using 2M PHY for uplink channels, 1M PHY is used for CIS uplink direction 523 and ACL uplink direction 524. Since no upstream audio is being transmitted, relatively little information is transmitted on CIS uplink direction 523 (compared to CIS downlink direction 521) for which a 1M PHY is sufficient. For example, CIS uplink direction 523 may primarily be used to acknowledge receipt of audio packets received on CIS downlink direction 521. Relative to CIS downlink direction 521, ACL uplink direction 524 may also transmit relatively small amounts of control data for which a 1M PHY is sufficient.

FIG. 6 illustrates an embodiment of a table 600 detailing how link margins can be improved by using a lower symbol rate for uplink communications when unidirectional audio is being output. In table 600, the link margin for Bluetooth Basic Data Rate/Extended Data Rate (BDR/EDR) is provided along with two link margins that factor in the jurisdiction for Bluetooth LE Audio. The Federal Communication Commission (FCC) link margin is used, for example, in the United States but the European Telecommunications Standards Institute (ETSI) may define different limits on power output, which affects the link margins.

For each link margin, an example situation is provided, using variables, involving an exemplary audio source (AS) and output device (OD). The actual link margin values, in dB, can vary based on the specific make and model of audio sources and output device used. However, table 600 illustrates the benefit that can be obtained by using a lower symbol rate for communication links that are not being used to transmit audio. Based on a determined location, the power output transmitted by the AS and OD can be varied to comply with the local regulatory domain.

As can be seen in reference to the "uplink" from the output device to the audio source for LE Audio in both regulatory domains, the respective link margin is increased by value B. In some embodiments, B is 3 dB. That is, by decreasing the symbol rate, such as from 2M to 1M for only the uplink direction of the communication links (e.g. CIS uplink direction and ACL uplink direction) from the audio output device to the audio source, the link margin in this direction is improved. In the illustrated example, while A is less than Z, A+B may be equal to Z, greater than Z, or is at least significantly closer to Z. By increasing the OD to AS link margin to be at least the same or closer in value to the AS to OD link margin, the overall communication link becomes more tolerant of attenuation and interference, which can result in fewer dropped packets and/or packet retransmissions.

Various methods can be performed using the systems of FIGS. 1A, 1B, 2, and 5. FIG. 7 illustrates an embodiment of a method 700 for improving short-range wireless communication link margins, such as for Bluetooth LE Audio. Method 700 involves an audio source device, such as a smartphone, computer, gaming device, receiver, and one or more audio output devices, such as one or a pair of earbuds (e.g., true wireless earbuds), wireless headphones, or one or more wireless speakers. Notably, in some embodiments of method 700, only blocks 710 to 730 may be performed. In other embodiments, only blocks 710-740 or 710-750 may be performed.

At block 705, a preference can be transmitted from the audio output device to the audio source device that indicates a preference for using both 1M PHY and 2M PHY. This preference information can be shared in multiple ways. For example, based on a type of audio output device being connected with the audio source device, the audio source device can determine that a lower PHY should be used when unidirectional audio is to be transmitted. For example, if the audio output device and the audio source device are made by the same manufacturer, the pair of device may default to using the arrangement of method 700.

At block 710, the audio source device can determine a type of audio communication that is about to be performed. The type of audio communication can be based on what application has been launched or is active on the audio source device. For example, a music streaming application or a video conferencing application are indicators of different types of audio communication being about to be performed. If the type of audio communication is determined to be unidirectional audio, that is, audio streamed from the audio source to the audio output device without any return audio in the opposite direction, method 700 can proceed to block 720. An example of unidirectional audio communication would be music playback. Otherwise, method 700 proceed to block 770.

At block 720, prior to unidirectional audio output beginning, a first PHY configuration is set for a first link from the audio source device to the audio output device (or audio output devices, such as if a pair of true wireless earbuds are being used). This first PHY configuration may be for the CIS downlink direction on which audio packets will be transmitted from the audio source device to the audio output device as part of the CIS link. For Bluetooth LE Audio, in some embodiments, the first PHY configuration is 2M. Once established, the first PHY configuration is maintained for the life of the CIS link. In order to maintain glitch-free audio output, the PHY rate must be set prior to audio output commencing.

At block 730, prior to unidirectional audio output beginning, a second PHY configuration is set for an uplink direction from the audio output device to the audio source device for the communication link. This second PHY configuration may be for the CIS link on which acknowledgements and negative acknowledgements will be transmitted by the audio output device to the audio source device. Notably, since the audio is unidirectional, much less data may be transmitted on this CIS link than the CIS link of block 720. The first PHY configuration has a greater symbol rate than the second PHY configuration. While the first PHY configuration can use 2M, the second PHY configuration can be 1M. Once established, the second PHY configuration is maintained for the life of the CIS link. In order to maintain glitch-free audio output, the PHY rate must be set prior to audio output commencing.

At block 740, again prior to unidirectional audio output beginning, the second PHY configuration can be set for the uplink direction from the audio output device to the audio source device for a second communication link. This link that uses the second PHY configuration in the uplink direction may be for the ACL link from the audio output device to the audio source device. Since the ACL link is used for control data, the data volume is low compared with the music data of the CIS link of block 720. As at block 730, the second PHY configuration can be 1M.

For the second communication, which can be the ACL link from the audio source device to the audio output device. The PHY configuration for the downlink direction can be set to either the first PHY configuration, the second PHY configuration, or some other PHY configuration. Since the ACL link is used for control data, the data volume is low compared with the music data of the CIS link of block 720. In some embodiments, for simplicity, the first PHY configuration may be used such that a consistent PHY is used for both CIS and ACL downlink communications from the audio source device to the audio output device.

After setup of the links between the audio source device and the audio output device, the unidirectional audio can be output as packets in the downlink direct via the first communication link that uses the first PHY configuration of block 720. At block 760, acknowledgements and negative acknowledgements (if needed) are transmitted to the audio source device in the uplink direction of the same communication link using the second PHY configuration. Additionally, control information can be transmitted in the uplink direction using the second communication link, which also uses the second PHY configuration. By virtue of the second PHY configuration being used on both communication links in the uplink direction, the improvement in link margin can make the overall communication link less susceptible to interference and attenuation.

If block 770 is performed following block 710, the same PHY configuration is used for both directions on each of the two communication links between the audio source device and audio output device. For example, for a two-way audio conference, 2M PHY can be used for both directions of the CIS link and both directions of the ACL link. Assuming the link margins from the audio output device to the audio source device is the lowest link margin, the arrangement of block 770 can result in the overall communications being more susceptible to interference and attenuation.

As an alternative embodiment, in some situations, block 710 may not need to be performed. For example, if the audio output device is only capable of outputting audio, such as if no microphone is present in a pair of earbuds, method 700 can proceed directly to block 720 since only the output of unidirectional audio is possible.

As another alternative embodiment, method 700 can be used in an arrangement involving an audio input device and a target device. For example, the audio input device could be a Bluetooth LE Audio wireless microphone and the target device would be a device that is receiving the captured audio from the microphone, such as a smartphone or receiver. In this embodiment, unidirectional audio is transmitted from the microphone to the target device. Accordingly, the first PHY configuration of block 720 is used on the direction of a CIS link to transfer the audio from the microphone to the target device. The second PHY configuration of blocks 730 and 740 can be used for the opposite direction of the CIS link and an ACL link from the target device to the microphone. The audio is then output from the microphone to the target device at block 750, with the target device responding with acknowledgements, negative acknowledgements, and/or control data via the second PHY configuration used on the direction of the links from the target device to the wireless microphone.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for improving wireless audio communication, the method comprising:
    determining, by an audio source device, that unidirectional audio is to be output, wherein:
        the unidirectional audio involves audio data being transmitted from the audio source device to an audio output device but no audio data being transmitted from the audio output device to the audio source device; and
    in response to determining that unidirectional audio is to be output, setting a first physical layer (PHY) configuration for a downlink direction of a first communication link from the audio source device to the audio output device and a second PHY configuration for an uplink direction of the first communication link from the audio output device to the audio source device, wherein:
    the first PHY configuration has a greater symbol rate than the second PHY configuration.

2. The method of claim 1, wherein the first communication link is a connected isochronous stream (CIS) link.

3. The method of claim 2, wherein the first PHY configuration is 2M and the second PHY configuration is 1M.

4. The method of claim 2, wherein the second PHY configuration is used for the uplink direction of an asynchronous connection-oriented logical transport (ACL) link.

5. The method of claim 4, wherein the first PHY configuration is used for the downlink direction from the audio source device to the audio output device for the ACL link.

6. The method of claim 1, wherein determining that unidirectional audio is to be output comprises determining that music is to be output.

7. The method of claim 2, wherein the audio output device is an earbud of a pair of true wireless earbuds.

8. The method of claim 2, further comprising:
    initiating, by the audio source device, transmission of audio packets to the audio output device using the CIS link in the downlink direction; and
    receiving, by the audio source device, acknowledgements from the audio output device using the CIS link in the uplink direction.

9. The method of claim 1, further comprising:
    determining a location of the source audio device, wherein setting the first PHY configuration and the second PHY configuration is further based on the determined location of the audio source device.

10. A system for improving wireless audio communication, the system comprising:
    an audio source device, comprising:
    a wireless communication interface; and
    a processing system comprising one or more processors, wherein the audio source device is configured to:
        determine that unidirectional audio is to be output, wherein:
            the unidirectional audio involves audio data being transmitted from the audio source device to an audio output device but no audio data being transmitted from the audio output device to the audio source device; and
        in response to determining that unidirectional audio is to be output, set a first physical layer (PHY) configuration for a downlink direction of a first communication link from the audio source device to the audio output device and a second PHY configuration for an uplink direction of the first communication link from the audio output device to the audio source device, wherein:
            the first PHY configuration has a greater symbol rate than the second PHY configuration.

11. The system of claim 10, further comprising an audio output device, that comprises:
    a second wireless communication interface; and
    a speaker.

12. The system of claim 11, wherein the audio output device is an earbud of a pair of true wireless earbuds.

13. The system of claim 10, wherein the first communication link is a connected isochronous stream (CIS) link.

14. The system of claim 13, wherein the first PHY configuration is 2M and the second PHY configuration is 1M.

15. The system of claim 14, wherein the second PHY configuration is used for the uplink direction of an asynchronous connection-oriented logical transport (ACL) link.

16. The system of claim 15, wherein the first PHY configuration is used for the downlink direction from the audio source device to the audio output device for the ACL link.

17. The system of claim 10, wherein the audio source device being configured to determine that unidirectional audio is to be output comprises the processing system of the audio source device being configured to determine that music is to be output.

18. The system of claim 13, wherein the audio source device is further configured to:

initiate transmission of audio packets to the audio output device using the CIS link in the downlink direction; and receive acknowledgements from the audio output device using the CIS link in the uplink direction.

19. The system of claim 10, wherein the audio source device is further configured to:

determine a location of the source audio device, wherein setting the first PHY configuration and the second PHY configuration is further based on the determined location of the audio source device.

20. A non-transitory processor-readable medium, comprising processor- readable instructions configured to cause one or more processors of an audio source device to:

determine that unidirectional audio is to be output, wherein:

the unidirectional audio involves audio data being transmitted from the audio source device to an audio output device but no audio data being transmitted from the audio output device to the audio source device; and in response to determining that unidirectional audio is to be output, set a first physical layer (PHY) configuration for a downlink direction of a first communication link from the audio source device to the audio output device and a second PHY configuration for an uplink direction of the first communication link from the audio output device to the audio source device, wherein:

the first PHY configuration has a greater symbol rate than the second PHY configuration.

* * * * *